3,502,479
PROCESS OF MAKING A SNACK PRODUCT
Norman S. Singer, Somerset, and Ernesto G. Beltran, Maywood, N.J., assignors to Thomas J. Lipton, Inc., Englewood Cliffs, N.J., a corporation of Delaware
No Drawing. Filed June 20, 1966, Ser. No. 558,565
Int. Cl. A23l 1/10, 1/18
U.S. Cl. 99—100                                                                 8 Claims

ABSTRACT OF THE DISCLOSURE

A process of preparing low density, low calorie snack-type food products which includes the steps of (1) forming a dough comprising a pregelatinized starch, water and a saturated monoglyceride, (2) extruding the dough to form a thin sheet of uniform thickness, (3) subdividing the dough into dough pieces, and (4) drying the dough pieces to a moisture content of 5%–8% to form a half-product. The half-product is (5) subjected to intense infrared radiation to puff the product and form the low density, low calorie snack.

---

This invention relates to a novel, low calorie, low density snack-type food product and to the process of preparing the same.

A wide variety of starch and protein based food products are presently available to the consumer for use as snacks. Many are in the form of chips, strips, extruded tubular pieces and the like. Many are expanded or puffed and contain a cellular or honeycombed internal structure. In addition, most of present day snack products contain a fairly high level of fat, either in the form of separately added ingredients, such as cheese, or in the form of fat imparted to the product during cooking thereof, as with potato chips. The fat improves the flavor and palatability of the various products. However, the presence of fat increases the caloric value of the product, and it is desirable to provide a low fat product which has an attractive appearance, texture and taste.

In prior art snack making processes, it has been recognized that the use of a pregelatinized or preswelled starch results in a diminished cooking time for the final product and has other advantages. When pregelatinized potato flour is used to prepare a dough, however, the developed dough is hard to handle and will set to form a hard, plastic mass which may cause the extruder to burst.

It is an object of this invention to provide a low calorie, low fat content snack having the crispness, texture and excellent eating quality of snacks containing a relatively high fat content.

It is another object of this invention to improve the handling characteristics of doughs containing pregelatinized flours.

It is another object of this invention to provide a novel snack having the approximate shaped and form of potato chips but having a much lower bulk density, a substantially lower fat content, and the same attractive appearance and desirable eating qualities.

It has now been found that a low density, low calorie snack, in chip or other suitable form, may be prepared by (1) forming a dough comprising a pregelatinized starch, a saturated monoglyceride and water, (2) extruding the dough, (3) forming the dough into dough pieces of the desired shape, (4) drying the dough to a suitable moisture content to form a so-called "half-product," (5) allowing the half-product to cool or age, and (6) thereafter introducing the half-product into a uniform field of high intensity infrared radiation to cause puffing of the product. The resulting material is a crisp short snack which, while containing less than 5% fat, simulates the texture and much of the eating quality of fried products having from 6 to 10 times as much fat. The product is stable over prolonged periods of storage.

The dense half-product can be kept without deterioration for long periods of time before puffing. In addition, it is readily amenable to being formed into a number of shapes.

The invention will be more particularly described in terms of a preferred embodiment, wherein snacks in the form of chips are formed from a dough containing pregelatinized potato flour and glyceryl monostearate.

Glyceryl monostearate is combined with water and a phosphated monoglyceride stabilizer to form a gel. The gel is then carried to a mixer, preferably a high intensity cutter-mixer, where it is intimately mixed with a pregelatinized potato flour and sufficient water to provide a particulate dough containing from 32% to 45% moisture. The particulate dough is then fed to an extruder, which may suitably be a 2 inch diameter high-pressure screw extruder. Exemplary conditions for operating the extruder are a dough temperature of 110° F., a die temperature of 180° F. and a stock pressure held at 1,000 p.s.i.g. The dough is formed by the extruder and die into a very thin sheet (0.4 mm. thick). The sheet is partially dried and firmed by blasts of hot air as it issues from the die. The sheet is caught by a set of tensor rolls which are positively driven, causing stretching of the sheet, and helping to keep it flat. The extruded and stretched dough is cut into pieces of the desired shape prior to cooling and drying to a moisture content of 5 to 8%. The dough pieces are then allowed to cool or age and the resulting dense, vitreous intermediate or half-product may be stored for months before any further processing takes place. Alternatively, the leathery transparent sheet is dried to a moisture content of about 5%–8%. Following drying, the sheet is made flexible by heating to about 160° F. and then cut into any suitable form. A Moline cutter is available which scraplessly cuts the sheet into dough pieces of hexagonal form.

The half-products are prepared for consumption by puffing in a field of high intensity infrared radiation under conditions whereby the temperature of the article or piece is raised from room temperature to 230° F. in from 5 to 10 seconds. The use of high intensity infrared radiation is important to the realization of good results; it has been found that a hot air oven or microwave oven will not provide satisfactory results. The power density immediately adjacent the dough pieces during puffing must be within the approximate range of 20 to 50 watts per square inch.

One suitable source of high intensity infrared radiation is an infrared oven having heating panels arranged both over and under an endless belt so that both surfaces of the product may be exposed substantially equally to the radiation source.

One suitable oven design is an electrically powered infrared dual radiation oven 2 feet long, 2½ feet wide and containing a total of 4 high temperature heating modules which are capable of 2,000° F. maximum source temperature. Heating panels are arranged top and bottom, each containing two modules. Between the top and bottom panels are aluminum side reflectors. An endless aluminum wire mesh belt passes through the center of the oven. The top and bottom distance between heating modules and belt surfaces are adjustable.

Suitable conditions are obtained in the apparatus described above by setting both the top and bottom heat sources at 1600° F., by spacing them 3½ and 1½ inches from the belt, respectively. Acceptable results have been obtained when the temperature of the source, measured ½ inch behind the element, was between 1400° F. and 2000° F.

Observations during a 5 second puffing cycle show that after a two second lag, a relaxation of form takes place indicating that the dough piece has become flexible. After an additional 2 seconds of heating, the moisture content explosively converts to steam with observable expansion of the dough piece which stretches and inflates the flexible matrix. Additional heating beyond the puffing stage causes burning or over-toasting of the product and should be avoided.

The dough may be formed by any suitable means. In accordance with one procedure, an aqueous gel is made with the water and monoglyceride and this gel is then intimately mixed with a pregelantinized potato flour. Flavors, colors and additional water are then added with extensive mixing to form a particulate dough.

When the aqueous gel containing monoglyceride is made in large quantities, to be used over a period of days, it is preferred to employ a stabilizer for this gel, such as a phosphated monoglyceride. If the gel is to be used within a short time, however, a stabilizer is not required.

During the extrusion process the discontinuous, cold, partially hydrated dough is transformed by use of appropriate extrusion conditions into a continuous, homogeneous, hot, extensively hydrated, thin, transulcent sheet. As the potato dough is churned within the extruder, sufficient frictional heat is generated to raise the temperature of the dough. If the product is permitted to reach a temperature as high as 160° F., and if insufficient pressure is developed, the extruded product is an undesirable friable, white, cottony mass. Care must be taken to maintain a sufficiently high pressure when the temperature of the product is above about 120° F. to insure that the extruded product is the desirable coherent translucent sheet. A pressure of 1000 p.s.i.g. is preferred, and pressures as high as 7000 p.s.i.g. have been used to advantage. Further, temperatures in excess of 160° F. should not be used because the higher temperatures cause the starch to partially degrade, with the result that the final product requires excessively long drying times.

It is also of assistance in the extrusion step to insure that the temperature of the die is above the temperature of the product within the extruder. This provision insures a rapid flow rate of the product through the die. There should be at least 20° F. difference between the dough temperature and the temperature of the die. The maximum die temperature is that temperature beyond which the extruded product commences to bubble due to the boiling of the water contained therein.

The sheet as it issues from the die is above its plastic deformation temperature. The temperature drops rapidly as the product leaves the die. The application of constant tension to the sheet brings about some controlled stretching which is a means of obtaining a flat sheet as well as acting to assist in increasing the flow rate and to control the thickness of the sheet. Acceptable results have been obtained when the sheet thickness was in the range of 0.25 mm, to 0.55 mm. A preferred sheet thickness is 0.4 mm.

The pregelatinized starch which may be used in forming the doughs of the present invention include any pregelatinized flour, such as pregelatinized rice, wheat and potato flour. Pregelatinized potato starch has been found useful, and a preferred product is pregelatinized potato flour. A low-sugar content potato flour, obtained from potatoes before their reducing sugar content exceeds 2%, provides a firmer, more cohesive and translucent sheet, and is preferred.

The saturated monoglyceride which may be used according to this invention includes glyceryl monostearate and other distilled high purity monoglyceride compositions, such as those disclosed in U.S. patents, Nos. 2,634,234, 2,634,278 and 2,634,279. Suitable products are marketed as Myverol type 18-00 and type 18-07 distilled monoglycerides, which are obtained from lard and cottonseed oil respectively. A preferred level of saturated monoglyceride used in the doughs of this invention is 2% on a dry solids basis, although acceptable results are obtained at levels as low as 0.5%. On the other hand, amounts of monoglyceride above about 4% may be undesirable because of a soapy taste it imparts to the product. The monoglyceride forms a tasteless complex with amylose; starches having a high level of amylose can tolerate a higher level of monoglyceride before undesirable taste appears.

Sufficient moisture is added to the dough to make it readily extrudable in the form of a self-supporting sheet. The moisture content can vary from about 25% to about 55%, a preferred moisture content being in the approximate range of 30% to 45%.

The following examples are given to further illustrate this invention.

EXAMPLE I

A snack product, having the shape and many other desirable characteristics of a potato chip, was prepared by the following procedure.

A gel was made by combining 10 parts of Myverol 18–07 with 88 parts of water and 2 parts of a phosphated monoglyceride stabilizer, the parts being by weight. Myverol 18–07 is glyceryl monostearate distilled from fully hydrogenated cottonseed oil. The gel was made by heating the water to 155° F., adding a dry blend of the Myverol and phosphated monoglyceride to the heated water, maintaining the temperature above 140° F. until the fatty material had been fully incorporated into the water, and continuing the mixing until the gel had cooled below 110° F. The cooled hydrate was a white, glossy, pourable gel having good emulsifying properties.

A dough was then prepared having the following formulation:

| Ingredient: | Percentage, by weight |
|---|---|
| Potato flour, low sugar content | 57.05 |
| Myverol gel | 9.40 |
| Flavoring | 1.25 |
| Sucrose | .30 |
| Water | 32.00 |

In preparing the dough, the dry ingredients were blended for two minutes in a Hobart mixer. The flavoring materials were incorporated into the Myverol gel and the flavored gel was then added in a fine stream to the dry material in the mixer, with agitation. Mixing was continued until a uniform distribution of the gel throughout the dry ingredients was obtained. Cold water was then added at a moderate rate and mixing was continued until a dough of uniform quality was obtained.

The dough was then fed into a 2 inch diameter Bonnot Laboratory screw extruder to which was attached a Teflon-lined die adapted to provide a 3 inch wide slit of variable thickness. In performing the extrusion operation, the die was preheated to within the approximate range of 130° F. to 150° F. Hot air blowers were set up to maintain the die at this temperature. The barrel of the extruder was maintained at a temperature of 115° F. The slit was adjusted so as to provide an unstretched sheet thickness of about 0.45 mm.

After a short period of operation, the extruded sheet became uniform and translucent, at which point it was attached to and taken up by a take-up reel for storage. The reel was maintained at a speed slightly faster than the speed at which the sheet was extruded, so that the sheet was stretched, and the thickness of the sheet was reduced to about 0.4 mm. by virtue of the stretching.

The sheet was cut with a Moline ¾ inch scrapless biscuit cutter to form dough pieces of hexagonal shape. These pieces were then dried to a moisture content of 7–8%. At this level, the pieces could be flexed through an angle of 30° without breaking and the materials could be stored in hermetically sealed containers for subsequent treatment.

The dough pieces prepared above were puffed by passing them through an electrically powered infrared radiation oven containing two panels as shown in the drawing. The upper panel was heated to 1400° F. and was lowered to within 3 inches from the belt. The lower panel was heated to 1500° F. and raised to within 1 inch of the belt, and a belt speed of about 20 feet per minute as used.

In place of the usual stainless steel mesh belt, an endless belt made of aluminum screening was used.

The resulting product had a bulk density of 0.03, was crisp and surprisingly strong. Although very light in weight, it was more resistive to breakage than potato chips. Examination of the product showed that it consisted of two outer surfaces joined by a honeycombed matrix of bubble films, approximately one bubble thick.

One portion of the chips was set aside immediately after the puffing step while still warm (about 150° F.) and was sprinkled with a mixture of finely powdered hard fat, salt, and flavoring. The fat used was fully hydrogenated cottonseed oil, M.P. 137° F. The flavoring mixture was securely bonded to the surface of the chips.

EXAMPLE II

A snack product having the shape and other desirable characteristics of a potato chip was prepared, having the following composition, on a dry solids basis:

| Ingredient: | Percent by weight |
|---|---|
| Potato flour | 83.74 |
| Carrageenan | 0.3 |
| Cottonseed oil | 0.78 |
| Myverol 18-07 | 1.5 |
| Phosphated monoglyceride | 0.3 |
| BHT antioxidant | 0.03 |
| Food color | 0.02 |
| Monosodium glutamate | 2.6 |
| Sucrose | 0.73 |
| Flavor, smoked meat type | 4.8 |
| Salt | 2.0 |
| Powdered hydrogenated cottonseed oil, IV 5 | 3.2 |

A gel was made by combining 88 parts of water heated to 150° F. with 10 parts of the Myverol 18-07, 2 parts of phosphated monoglyceride and BHT to the heated water, maintaining a temperature above 140° F. until the fatty material was fully incorporated into the water, and by continuing the mixing until the gel cooled below 110° F. The cooled hydrate was a white, glossy, pourable gel having good emulsifying properties. This gel was then combined with a uniform mixture of potato flour, carrageenan and cottonseed oil to form a dough. A separate aqueous solution, containing monosodium glutamate, sucrose and the food color, was prepared, and this solution was added to the dough in a high intensity cutter mixer. The solution contained an amount of water sufficient to adjust the moisture content of the dough to about 45%.

The premix of these two materials was prepared in the high-intensity cutter mixer and the premix, in the form of discrete pellets of dough, was fed to a 2 inch diameter, high-pressure screw extruder. The extruder was fitted with a Teflon lined die adapted to provide a 3 inch wide slit of variable thickness. Hot air blowers were set up to maintain the die at a desired temperature within the range of about 130° F. to about 150° F. The barrel of the extruder was maintained at a temperature of about 115° F. and the die was adjusted to provide an unstretched sheet of a thickness of about 0.45 mm.

The dough sheet was then subjected to stretching, cutting, predrying, and drying operations outlined in Example I above, using the same conditions. Immediately upon leaving the infrared cooker, the chips were sprinkled with a mixture of the flavor, salt and powdered fat given in the table above. The heat present in the chip caused melting of the flavoring composition and subsequent hardening thereof, securely bonded the composition to the surface of the chip.

We claim:
1. A process of preparing a snack product which comprises the steps of (1) forming a dough consisting essentially of pregelatinized starch, water and a gel containing a saturated monoglyceride obtained from a fat seletced from the group consisting of lard and cottonseed oil, (2) extruding the dough to form a uniformly thin dough sheet, (3) subdividing the extruded dough into pieces and drying the dough pieces to a moisture content of about 5% to 8%, and (4) subjecting the dough pieces to intense infrared radiation for a time sufficient only to puff the pieces.

2. The process of claim 1 wherein the dough formed in step (1) contains about 45% moisture.

3. The process of claim 1 wherein the intense infrared radiation has an intensity of about 20 to about 50 watts per square inch, and is obtained from a power source having a temperature within the approximate range of 1400° F. to 2000° F.

4. The process of claim 1 wherein the extruded dough sheet has a thickness within the range of about 0.25 mm. to about 0.55 mm.

5. The process of claim 4 wherein the dough sheet is stretched after extrusion.

6. A process of preparing a low density, low calorie snack type product which comprises the steps of (1) forming a gel containing glyceryl monostearate and water, (2) adding the gel to pregelatinized potato flour to form a dough having from 35% to 45% water, (3) extruding the dough to form a sheet having a thickness of about 0.25 mm. to about 0.55 mm., (4) subdividing the dough sheet into pieces, and drying them to a moisture content of about 7% to 8%, (5) subjecting the dough pieces to a high intensity infrared radiation source, the temperatures of the source ranging from 1400° F. to 2000° F. and the source producing a power density in the range of about 20 to about 50 watts per square inch of radiating surface, the pieces being sufficiently close to the infrared source to raise the temperature of the pieces from about 80° F. to about 230° F. within five to ten seconds to cause the pieces to puff, and (6) cooling the pieces.

7. The process of claim 6 wherein seasoning and a small amount of powdered fat are sprinkled over the puffed pieces prior to cooling thereof.

8. The process of claim 6 wherein the dough pieces are coated with a light film of an edible fat, in an amount of no more than 15% by weight of the product.

References Cited

UNITED STATES PATENTS

| 3,027,258 | 3/1962 | Markakis et al. | 99—81 |
| 3,076,711 | 2/1963 | Gerkens | 99—100 |
| 3,216,829 | 11/1965 | Hansen | 99—92 XR |
| 3,332,781 | 7/1967 | Benson et al. | 99—81 |

RAYMOND N. JONES, Primary Examiner

U.S. Cl. X.R.

99—1